(12) United States Patent
Kourepenis et al.

(10) Patent No.: US 7,302,848 B2
(45) Date of Patent: Dec. 4, 2007

(54) FORCE COMPENSATED COMB DRIVE

(75) Inventors: Anthony S. Kourepenis, Acton, MA (US); Marc S. Weinberg, Needham, MA (US); Richard Elliott, Stoneham, MA (US); Steven Daley, Allston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 127 days.

(21) Appl. No.: 11/076,649

(22) Filed: Mar. 10, 2005

(65) Prior Publication Data

US 2006/0201250 A1  Sep. 14, 2006

(51) Int. Cl.
*G01C 19/00* (2006.01)
(52) U.S. Cl. .................................. 73/504.16
(58) Field of Classification Search ............. 73/504.16, 73/504.18, 504.14, 514.32
See application file for complete search history.

(56) References Cited

U.S. PATENT DOCUMENTS

| | | | | |
|---|---|---|---|---|
| 5,195,371 A | 3/1993 | Greiff | ...................... | 73/514.35 |
| 5,349,855 A | 9/1994 | Bernstein et al. | ........ | 73/504.16 |
| 5,388,458 A | 2/1995 | Weinberg et al. | ........ | 73/504.16 |
| 5,492,596 A | 2/1996 | Cho | ............................ | 438/50 |
| 5,505,084 A | 4/1996 | Greiff et al. | ............. | 73/504.14 |
| 5,635,639 A | 6/1997 | Greiff et al. | ............. | 73/504.04 |
| 5,672,949 A | 9/1997 | Ward | .......................... | 318/609 |
| 5,747,961 A | 5/1998 | Ward et al. | ................. | 318/646 |
| 5,767,405 A | 6/1998 | Bernstein et al. | ........ | 73/504.16 |
| 5,892,153 A | 4/1999 | Weinberg et al. | ........ | 73/504.16 |
| 5,911,156 A | 6/1999 | Ward et al. | ............... | 73/504.16 |
| 5,946,346 A | 8/1999 | Ahmed et al. | .............. | 375/219 |
| 5,992,233 A | 11/1999 | Clark | ....................... | 73/514.35 |
| 6,067,858 A | 5/2000 | Clark et al. | .............. | 73/504.16 |
| 6,155,115 A | 12/2000 | Ljung | ...................... | 73/504.12 |
| 6,230,567 B1 | 5/2001 | Greiff | ....................... | 73/514.37 |
| 6,250,156 B1 | 6/2001 | Seshia et al. | ............ | 73/504.12 |
| 6,257,059 B1 | 7/2001 | Weinberg et al. | ......... | 73/504.16 |
| 6,269,696 B1 | 8/2001 | Weinberg et al. | ............. | 73/497 |

(Continued)

FOREIGN PATENT DOCUMENTS

EP   0 280 905 A2   9/1988

OTHER PUBLICATIONS

N. Ito et al., "A Rapid and Selective Anodic Bonding Method", Jun. 1995, Transducers '95—Eurosensors IX, pp. 277-280.

(Continued)

*Primary Examiner*—Hezron Williams
*Assistant Examiner*—Tamiko Bellamy
(74) *Attorney, Agent, or Firm*—Iandiorio & Teska

(57) ABSTRACT

A force compensated comb drive for a microelectromechanical system includes a MEMS mechanism for providing an output signal representative of a physical quantity; a comb drive for actuating the MEMS mechanism; a comb drive circuit for providing a drive signal to the comb drive for developing a predetermined displacement applied by the comb drive to the MEMS mechanism; an automatic gain control responsive to a change in the force to provide a correction signal to the comb drive circuit to maintain the predetermined motion; and a compensation device responsive to the correction signal for adjusting the output signal of the MEMS mechanism to compensate for errors in the output signal due to a change in the predetermined force.

8 Claims, 7 Drawing Sheets

U.S. PATENT DOCUMENTS

| | | | |
|---|---|---|---|
| 6,548,321 B1 | 4/2003 | Sawyer | 438/50 |
| 6,550,329 B1 | 4/2003 | Watson | 73/504.13 |
| 6,571,630 B1 | 6/2003 | Weinberg et al. | 73/504.16 |
| 6,673,694 B2 | 1/2004 | Borenstein | 438/411 |
| 6,837,108 B2* | 1/2005 | Platt | 73/504.16 |
| 6,959,583 B2* | 11/2005 | Platt | 73/1.37 |
| 2001/0001928 A1 | 5/2001 | Kikuchi et al. | 73/504.12 |
| 2003/0077876 A1 | 4/2003 | Sawyer | 438/455 |
| 2003/0196491 A1* | 10/2003 | Platt | 73/504.12 |
| 2004/0035206 A1 | 2/2004 | Ward et al. | 73/514.32 |
| 2004/0083812 A1* | 5/2004 | Ichinose | 73/504.02 |

OTHER PUBLICATIONS

J.A. Plaza, A. Llobera et al., "BESOI-Based Integrated Optical Silicon Accelerometer," *JMEMS,* vol. 13, No. 2, 2004, pp. 355-364.

J.A. Plaza, J. Esteve, and E. Lora-Tamayo, "Simple Technology for Bulk Accelerometer Based on Bond Etch Back Silicon on Insulator Wafers," *Sensors and Actuators, Physics A,* vol. 68, 1998, pp. 299-302.

* cited by examiner

US 7,302,848 B2

FORCE COMPENSATED COMB DRIVE

FIELD OF INVENTION

This invention relates to a force compensated comb drive for a fixed volume microelectromechanical system (MEMS).

BACKGROUND OF INVENTION

Comb drives are used in a number of microelectromechanical systems (MEMS) to excite e.g., pressure sensors, optical devices and gyroscopes. In all of these applications any changes in the force applied by the comb device can produce errors in the output signal. For example, in MEMS gyroscopes, the proof mass and comb drive are typically encapsulated in a sealed package with fixed volume at low pressure. Any change in pressure changes in the mean free path and, hence, the force exerted by the comb drive and changes in temperature in the fixed volume result in changes in the pressure and gas viscosity which then effect the force exerted by the comb drive. For a fixed number of molecules in an evacuated fixed volume, the damping force from gas effects and, hence, drive amplitude, is independent of pressure. At near atmospheric pressures, the gas damping is independent of pressure, the volume, or the number of molecules. As temperature varies, the gas viscosity changes as well as the internal damping of the mechanical members. For many applications, the internal damping variation is larger than the gas viscosity variation. In particular, in a MEMS gyroscope, the change in temperature or pressure results in a change in the amplitude of the proof mass driving force which will appear erroneously as a change in input gyroscope rate or sensitivity. One approach to this problem is to mount the gyroscope in a temperature/pressure stable chamber. But the size of the chamber and complexity of the controls are incompatible with the miniaturization afforded by MEMS devices. Another solution is to mount a temperature/pressure sensor with the gyroscope and use a calibration algorithm to adjust gyroscope output signals to compensate for variations in temperature/pressure that effect the comb drives. These, too, are complex and add size and components to the comb drives operated MEMS device. Further, since in the case of temperature sensors, the thermal paths are different for the sensor and the comb drive, the sensor may never actually be measuring the accurate, real time temperature effecting the comb device.

SUMMARY OF THE INVENTION

It is therefore an object of this invention to provide an improved force compensated comb device for a MEMS.

It is a further object of this invention to provide such an improved force compensated comb device for a MEMS without additional temperature/pressure sensing elements and circuits.

It is a further object of this invention to provide such an improved force compensated comb device for a MEMS which compensates the MEMS mechanism output signal directly for changes in force applied to the MEMS mechanism.

It is a further object of this invention to provide such an improved force compensated comb device for a MEMS which eliminates thermal propagation errors associated with temperature sensors used to correct for temperature induced force variations.

It is a further object of this invention to provide such an improved force compensated comb device for a MEMS which corrects for temperature/pressure induced force variation errors more simply and inexpensively.

It is a further object of this invention to provide such an improved force compensated comb device for a MEMS which is compatible in size and simplicity with MEMS devices.

It is a further object of this invention to provide such an improved force compensated comb device for a MEMS which has improved accuracy for tuning fork gyroscopes.

The invention results from the realization that in a force compensated comb device for a microelectromechanical system (MEMS) the automatic gain control signal that responds to correct for changes in the force applied to the comb device is also a representation of the error that will occur in the output signal of the MEMS mechanism driven by the comb device and can be used to compensate for that error due to the changes in the force applied to the comb device resulting from changes in temperature/pressure in the device.

This invention features a force compensated comb drive for microelectromechanical system (MEMS) including a MEMS mechanism for providing an output signal representative of a physical quantity and a comb drive for actuating the MEMS mechanism. There is a comb drive circuit for providing a drive signal to the comb drive for developing a force applied by the comb drive to the MEMS mechanism to control displacement amplitude. An automatic gain control responsive to a change in the force provides a correction signal to the comb drive circuit to maintain the predetermined displacement amplitude. A compensation device responsive to the correction signal adjusts the output signal of the MEMS mechanism to compensate for errors in the output signal due to a change in the force.

In a preferred embodiment the MEMS mechanism may be a gyroscope, it may be a tuning fork gyroscope, it may be a temperature sensor, it may be a pressure sensor. The compensation device may include a microprocessor for executing an nth order constant coefficient equation.

The microprocessor is typically programmed to solve the equations wherein a rate output compensated for AGC effects is a function of uncompensated output voltage and an automatic gain control measured voltage. In one example, the microprocessor is programmed to solve the equations $\hat{\Omega}_1 = B(V_{AGC}) + S(V_{AGC})V_g$, where $\hat{\Omega}_1$ is a rate output compensated for AGC effects, $V_g$ is raw (uncompensated) gyroscope output voltage, and $V_{AGC}$ is an automatic gain control measured voltage;

$B(V_{AGC}) = B_0 + B_1 V_{AGC} + B_2 V_{AGC}^2 + B_3 V_{AGC}^3 + \ldots$, where $B(V_{AGC})$ is a moldeled bias, a function of the measured AGC voltage; and $S(V_{AGC}) = S_0 + S_1 V_{AGC} + S_2 V_{AGC}^2 + S_3 V_{AGC}^3 + \ldots$, where $S(V_{AGC})$ is a modeled scale factor, a function of the measured AGC voltage.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
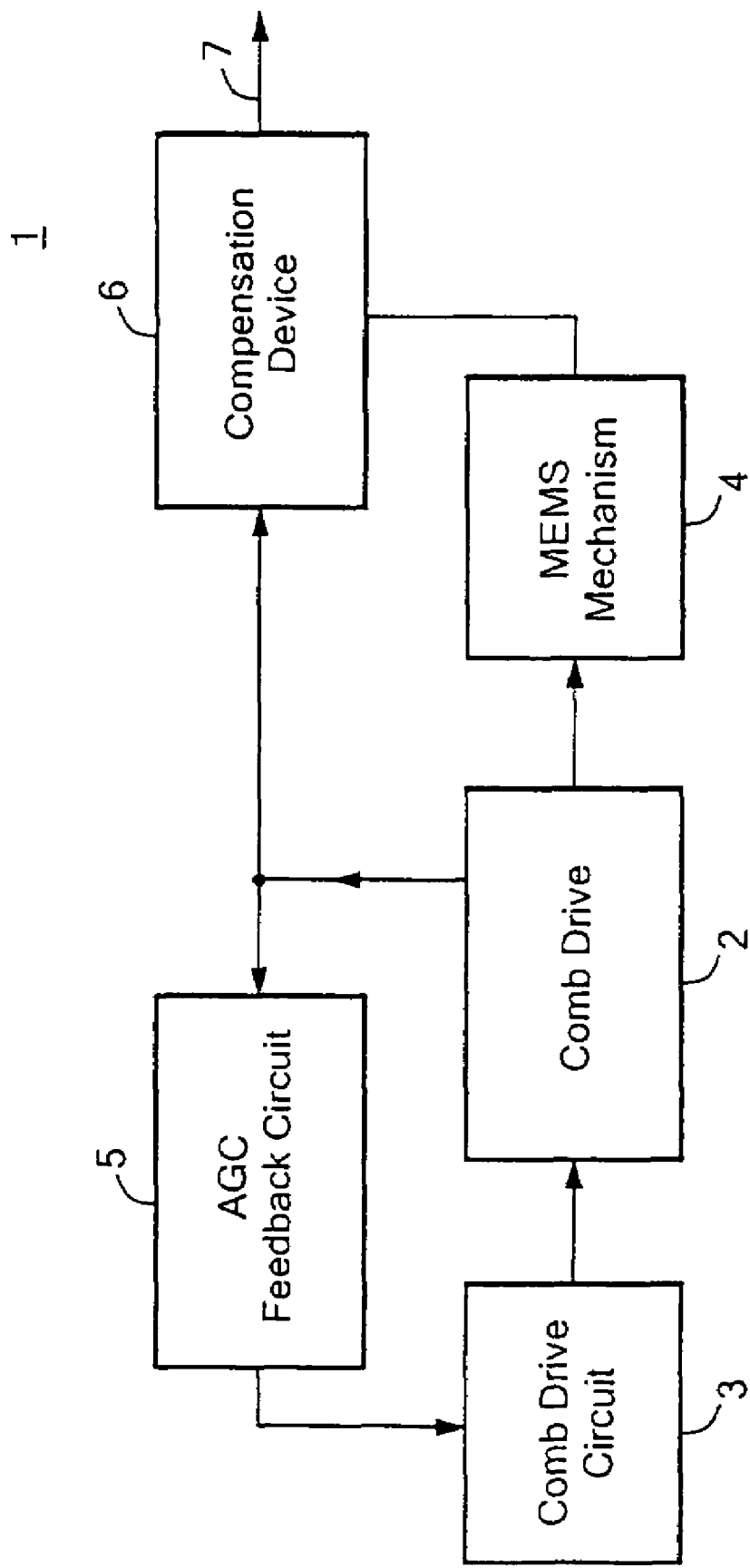
FIG. 1 is a schematic block diagram of a force compensated comb drive for a microelectromechanical system according to this invention.

There is shown in FIG. 1 a force compensated comb drive for a microelectromechanical system 1, typically but not necessarily fixed volume, according to this invention. Comb drive 2 is driven by comb drive circuit 3 to operate (e.g., vibrate) a MEMS mechanism 4. Any change in the motion of comb drive 2 is sensed and generates an automatic gain control (AGC) signal in the automatic gain control feedback circuit 5 which is fed back to the comb drive circuit 3 to reestablish the original proof mass displacement amplitude. The AGC signal is applied to the motor combs so that the comb force is adjusted to maintain the motion amplitude at a constant value.

One typical MEMS mechanism 4 is in a closed package having a fixed volume. Therefore, as will be explained more fully hereinafter, any change in pressure or change in temperature change the force being applied by comb drive 2. Because of silicon material properties and because the dependence of gas viscosity on temperature, the required motor force changes even at constant pressure. The AGC will then respond by changing sufficiently to adjust the output of comb drive circuit 3 to adjust the force level of comb drive 2 so that drive amplitude as detected by the motor detection hardware (26, 32) is maintained constant. Since the MEMS mechanism 4 is in a fixed volume closed system, it is effectively the temperature that has changed and so the change in the AGC signal is truly representative of the change in temperature. Knowing this, that change in the AGC signal can be used by compensation device 6 to adjust the raw signal coming from MEMS medium 4 to provide a compensated signal 7 which has been adjusted for any changes in temperature. The MEMS medium may typically be a tuning fork gyroscope such as shown in U.S. Pat. Nos. 5,349,855 and 5,388,458. Since this gyroscope in a closed package with fixed volume is sensitive to both temperature and pressure it can actually be used as a temperature or pressure sensor in accordance with this invention as well as a gyroscope or accelerometer.

Figure 2:
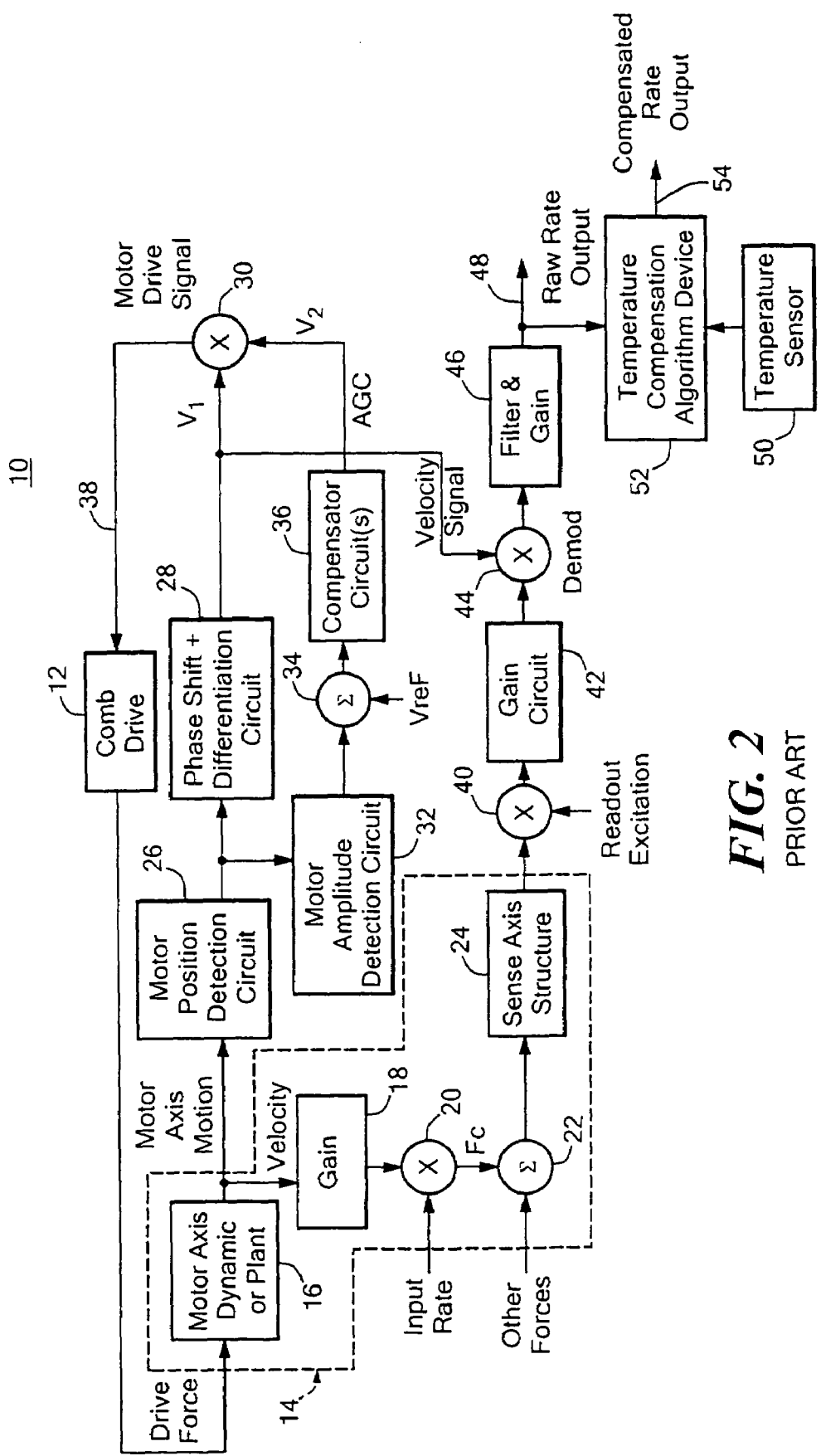
FIG. 2 is a more detailed schematic block diagram of a force compensated comb drive for a prior art microelectromechanical system in which the microelectromechanical mechanism is a gyroscope.

Before explaining this invention it is useful to understand a prior art device which uses conventional temperature/pressure compensation techniques. This is shown in FIG. 2 with a schematic diagram of a microelectromechanical system 10 with a comb drive 12. In this particular MEMS system 10, the MEMS mechanism is a gyroscope sensor 14 (discussed below and shown in FIG. 4). MEMS mechanism or gyroscope 14 includes a motor axis dynamics system or plant 16, gain 18, multiplier 20 for receiving the gyroscope input rate and a summer 22 for summing the Coriolis force in combination with the other forces and a sense axis structure which includes the proof mass and springs of the gyroscope and converts the forces from summer 22 to motion of the proof mass. In summer 34, the position signal generated by the detection circuit is compared to a reference voltage. The aim is to maintain the oscillation amplitude constant. The voltage proportional to motor position is shifted in phase 90 degrees with adjustment for any phase shift in the plant 16 or motor detection circuit 26; thus, the motor position is converted to a voltage $V_1$ proportional to motor velocity. This signal is provided to multiplier 30. A motor amplitude detection circuit 32 also responds to the motor position; the amplitude of the detected motion is compared in summer 34 with the voltage, $V_{ref}$, representing a reference amplitude. Any difference generates an output from compensator circuit 36 which is in effect the automatic gain control AGC signal $V_2$. This signal is also provided to multiplier 30 along with voltage $V_1$. The product of that multiplication by multiplier 30 is the motor drive signal on line 38 which is delivered to comb drive 12. Comb drive 12 actually drives the two proof masses in anti-parallel fashion in a typical MEMS tuning fork type of gyroscope as taught by U.S. Pat. No. 5,349,855. Comb drive 12 actually applies the mechanical force to the motor axis dynamics or plant 16 to move the proof masses in that anti-parallel fashion.

Figure 4:
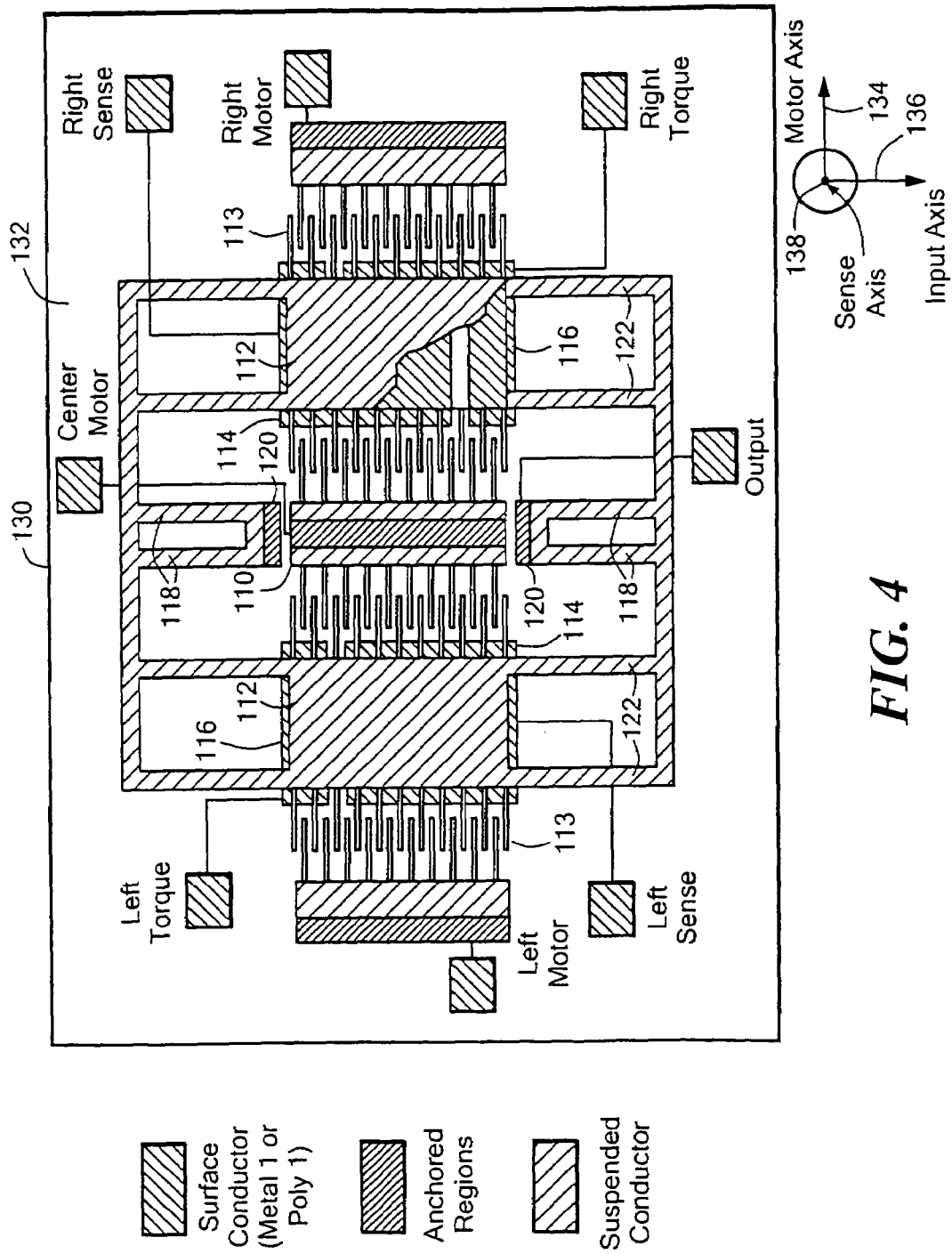
FIG. 4 is a schematic side elevational sectional view of a tuning fork gyroscope which may constitute the microelectromechanical system mechanism to be driven by the comb drive in accordance with this invention.

The motor axis motion which is delivered to the motor position detection circuit 26 is also delivered as a velocity to internal gain 18 which multiplies the velocity by a factor of 2m where m is mass of one proof mass (FIG. 4). The velocity multiplied by the factor of 2m is provided to multiplier 20 and multiplied by the gyroscope input rate to obtain the Coriolis force $F_c$. This is expressed as:

$$\vec{F}_c = 2m\vec{\Omega} \times \vec{V} \tag{1}$$

where V is the proof mass velocity relative to the substrate and Ω is the substrate and case angular rate, the quantity which the gyroscope is intended to detect.

The Coriolis force $F_c$ is then combined with various other error forces in the system in summer 22 and drives to the sense axis structure 24 which includes the proof mass flexures and the proof mass. The sense axis motion is provided as a voltage to multiplier 40 which multiplies the sense axis motion voltage times the readout excitation obtained from the capacitor voltage which is an indication of the movement of the proof masses on the sense access. This represents the gyroscope rate and is amplified in gain circuit 42 and delivered to multiplier 44 which acts as a demodulator. The demodulating signal is the velocity signal from phase shift and differentiation circuit 28. The demodulated circuit then is provided to a filter and further amplification in filter and gain circuit 46 to provide the raw rate output at 48. Since the entire gyroscope 14 is contained in a sealed package and has a fixed volume any change in temperature effects a change in pressure in that volume. Furthermore, any change in pressure changes the quality factor or Q which effects the force required to operate the comb drive. This can be seen from the fact that the motor access and dynamics at resonance can be expressed as follows:

$$\frac{X_m}{F} = \frac{Q}{k} = \frac{1}{bw_m} \quad (2)$$

where $X_m$ equals the motor amplitude, F equals applied motor force, Q equals quality factor, k is stiffness in the motor axis, $w_m$ is the drive resonance frequency and b is the damping constant. For MEMS devices in evacuated systems at constant temperature it is also true that the quality factor Q is proportional to one over the pressure P;

$$Q \sim \frac{1}{P} \quad (3)$$

More specifically at constant temperature, the gas damping is proportional to the Knudsen number, which is the ratio of mean free path divided by a gap width. The mean free path is proportional to molecule density which is proportional to pressure. Equation (3) is typically valid over the pressure range 0.001 to 10 Torr for well-constructed silicon MEMS gyroscopes and other devices. In addition to mean free path effects, gas viscosity and, hence, damping is temperature dependent.

It is also well known that in a fixed volume pressure is proportional to temperature $$P = k_T T \quad (4)$$

Thus, it can be seen that in the fixed volume situation of gyroscope 14 and FIG. 2, any change in temperature will affect a change in pressure. It can further be seen that any change in pressure will effect Q and it can be seen from equation (2) that Q affects F; therefore it follows that any change in either the temperature or the pressure is going to cause a change in force. This is not generally true with conventional large sensors but is important in MEMS sensors. In a MEMS tuning fork gyroscope, for example, most of the errors depend on the drive force. The change in force as explained with respect to FIG. 2 is going to cause a shift in the automatic gain control in order to reestablish the normal drive motion level.

In prior art devices, the raw output 48 must then be compensated for any changes in the force caused by changes in temperature and pressure. For example, where temperature is the concern, a temperature sensor 50 is used in order to record the ambient temperature. Any change in that temperature is delivered to temperature compensation algorithm device 52 which contains a calibration algorithm matching changes in temperature to changes in the gyroscope rate output so that the output of the temperature compensation algorithm device 52 is the compensated rate output at 54 adjusted for any changes in temperature.

Figure 3:
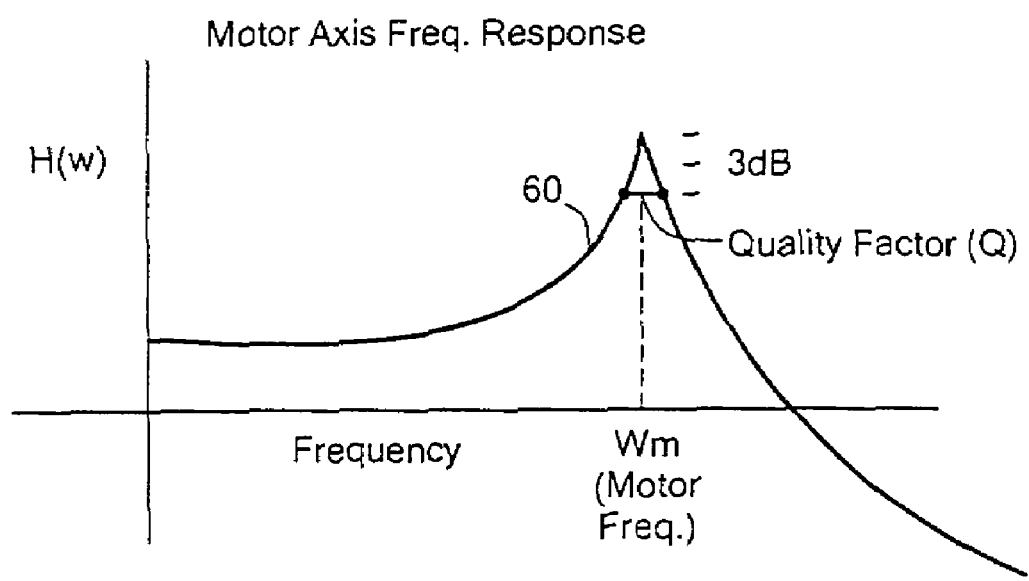
FIG. 3 is an illustration of the motor axis frequency response for a typical comb drive in accordance with this invention.

There is shown in FIG. 3, the motor axis frequency response of the comb drive where the ordinate represents the amplitude $H(\omega)$ of the comb drive motion and the abscissa the frequency. It can be seen there that the frequency response 60 peaks at a frequency $\omega_m$ where a quality factor or Q is measured. $\omega_m$ is the resonant point which is expressed as:

$$\omega_m = \sqrt{k/m} \quad (5)$$

where k is the spring constant of the proof mass and m is the mass of the proof mass. The aim in these MEMS devices is to keep the amplitude of oscillation $X_m$ constant.

$$X_m = \frac{F \cdot Q(P, T)}{K} \quad (6)$$

where F is the force applied to the comb drive, Q is the quality factor, P and T are pressure and temperature and K is the spring constant of the mass. Thus it can be seen that if the force changes in order to keep $X_m$ constant then either P or T must change and that is the purpose of the automatic gain control feedback system in these devices.

A typical microelectromechanical system MEMS mechanism gyroscope has a center motor 110, FIG. 4 having proof masses 112 with comb structures disposed on both sides. Locating the proof mass 112 and comb structures 113 as illustrated with respect to the center motor 110 increases symmetry and allows both drive and sense in the in-plane resonance. The sense electrodes 114 and torque electrodes 116 in this illustrative embodiment are disposed directly beneath the oscillating proof mass 112. Multiple torsion springs 118 or flexures can be implemented, such as in pairs to provide the rotational axis for the transducer. The torsion springs 118 have anchored regions 120 that are located inward toward the center of the device reducing stress and increasing out-of-plane stiffness. Moving the anchored regions 120 toward the masses and device center increases stiffness by effecting two short beams with springs which bend less as opposed to one long spring. Similarly multiple support springs 122 are implemented in pairs supporting the masses 112 on opposing sides thereof. The suspended structure can be made of doped crystalline silicon. Further details of this device and its operation and control is contained in U.S. Pat. Nos. 5,349,855 and 5,388,458 which are incorporated herein by reference in their entirety. The entire MEMS gyroscope of FIG. 4 is enclosed in a sealed package 130 containing a fixed volume 132. The relative orientation of the motor axis 134, gyro input axis 136, and sense axis 138 are also shown in FIG. 4.

Possible variations include the configuration and number of proof masses and suspension beams, the configuration and number of motor drive and sense combs, and the use of a rebalance torque electrode for the sense axis. Other materials are possible. Units of doped crystalline silicon for the suspended conductor with metal surface conductors (electrodes) can be built. In FIG. 4, the suspended conductor could be crystalline silicon or crystalline silicon with various dopants such as boron, phosphorus, or gallium arsenide. Many designs do not have torque plates below the proof mass. These are operated "open loop" with only sense plates below the proof mass. The substrate can be glass, silicon with an oxide layer, or other material.

Although the MEMS mechanism shown is a gyroscope, it is clear that since a gyroscope's action is sensitive to pressure and/or temperature it may function as either a gyroscope, a temperature sensor or pressure sensor and the device shown in FIG. 4 is a depiction of the one device that functions as all three.

Figure 5:
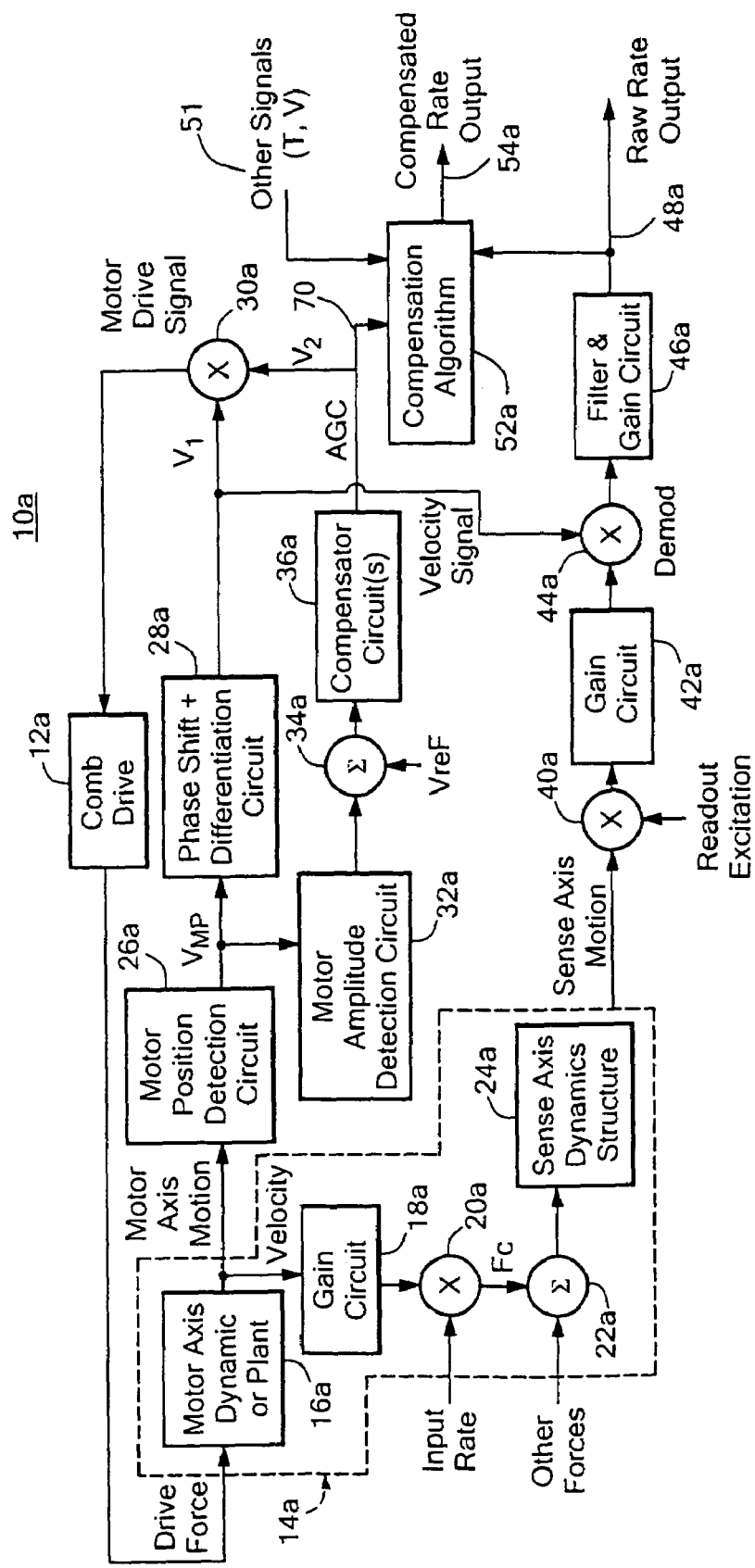
FIG. 5 is a more detailed schematic view similar to that of FIG. 2 showing the force compensated comb drive for a fixed volume microelectromechanical system of FIG. 1 according to this invention.

In accordance with the subject invention the MEMS device 10a, FIG. 5, operates similarly except that no temperature sensor is required. Instead, device 10a includes compensation algorithm device 52a which may be analog or digital and may be a hard wired circuit or a programmable microprocessor. Whatever its form, it does not require a separate temperature or pressure input to indicate the ambient conditions that are effecting the force on the comb drive, rather it relies on the fact that any change in the AGC is representative of the change in temperature/pressure and can be used directly via line 70 in compensation algorithm device 52a to adjust the raw signal output on line 48a to obtain the compensated rate output 54a. Compensation algorithm device 52a in one example, accomplishes this by implementing nth order constant coefficient equations of the form:

$$\hat{\Omega}_1 = B(V_{AGC}) + S(V_{AGC})V_g \quad (7)$$

where $\hat{\Omega}_1$ is the rate output compensated for AGC effects, $V_g$ is the raw (uncompensated) gyroscope output voltage, and $V_{AGC}$ is an automatic gain control measured voltage;

$$B(V_{AGC}) = B_0 + B_1 V_{AGC} + B_2 V_{AGC}^2 + B_3 V_{AGC}^3 + \ldots \quad (8)$$

where $B(V_{AGC})$ is a modeled bias, a function of the measured AGC voltage; and $$S(V_{AGC}) = S_0 + S_1 V_{AGC} + S_2 V_{AGC}^2 + S_3 V_{AGC}^3 + \ldots \quad (9)$$

where $S(V_{AGC})$ is a modeled scale factor, a function of the measured AGC voltage.

In equations (7)-(9), a constant coefficient polynomial fit is shown. Other functions or look-up tables could be used. In addition to bias and scale factor, other terms such as scale factor nonlinearity in input rate and misalignment angles could be modeled with the AGC signal.

Drive motion amplitude is fixed by the motor pick off, reference voltage, and the automatic gain control loop. If the force acting on the proof mass changes, the AGC adjusts the comb drive to main the desired motion amplitude. The AGC signal is a function of (ideally, proportional to) the electrostatic force exerted through the drive combs. Because operation is at the drive mode resonance, when damping changes the motor drive force changes.

Several important errors are caused by changes in the damping or motor drive force which depends on damping. Drive motion is coupled into sense axis hydrodynamic force (surf-boarding), a function of effective viscosity and, hence, damping. The gas damping depends on pressure and temperature. Because of asymmetries in the combs, drive forces result in erroneous forces along the sense direction. Damping causes a phase shift between the sense axis response and the drive motion. This phase shift causes quadrature signals (see U.S. Pat. No. 6,571,630 incorporated herein by this reference) to couple into errors in rate estimation. The desired estimate of angular rate output is proportional to drive velocity. Quadrature signals depend on drive position and include motion caused by mechanical asymmetries or injection of electrical charge with drive position.

The automatic gain control voltage is related to the voltages applied to drive the proof mass and is proportional to the force applied for drive motion. In general, the AGC signal is a function of material damping and gas damping, which depends upon gas viscosity and density of molecules. Therefore, the gas damping depends on temperature and pressure while material damping is usually a function of temperature. With a fixed volume and number of molecules, the pressure and, hence, the AGC signal are functions of temperature.

In equations (7)-(9) and in FIG. 5 temperature, pressure, or other signals 51 could be used for compensation in addition to AGC signal.

Figure 6:
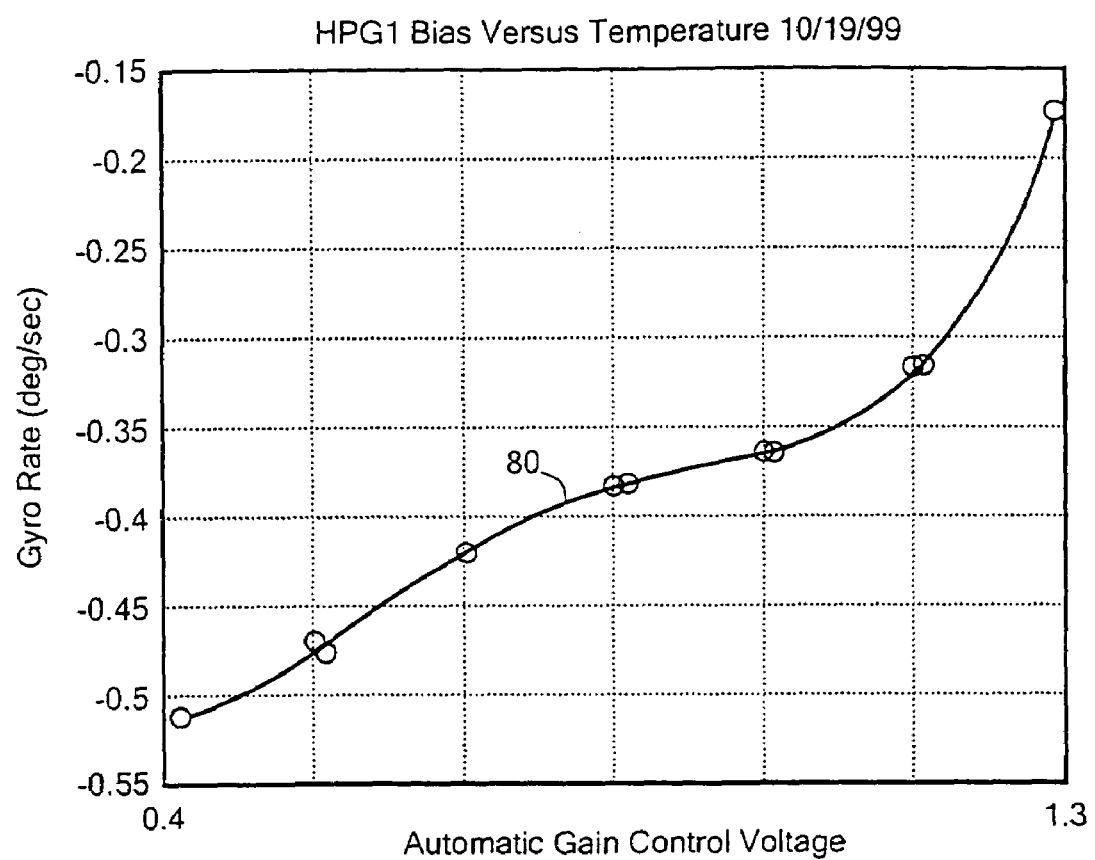
FIG. 6 is an illustration of the variation of the gyroscope rate with automatic gain control voltage in a prior art compensated comb drive microelectromechanical system.
Figure 7:
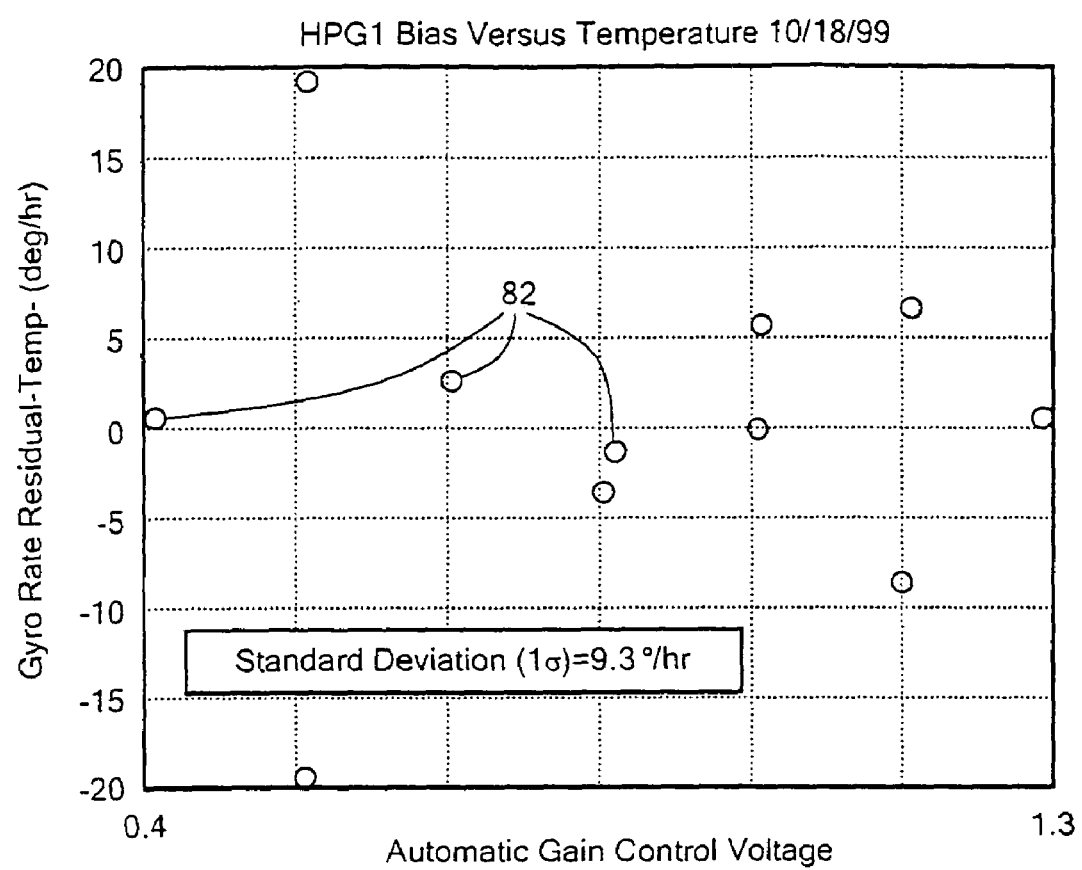
FIG. 7 is a view similar to FIG. 6 illustrating the variation in gyroscope rate with automatic gain control voltage in a force compensated comb drive fixed volume microelectromechanical system according to this invention.

FIG. 6 depicts the gyro rate in degrees per second on the ordinate while the abscissa shows the automatic gain control voltage. The characteristic shown at 80 has a raw sensitivity of 1000 degrees per hour. In FIG. 6, the AGC signal, which is proportional to the motor drive force, changes from 0.4 to 1.3 V, a factor of 3, over a temperature change from −40° C. to +80° C. The realization that the AGC signal contains very useful important information, whether it is force, pressure, or temperature, is one aspect of the subject invention. After compensation in accordance with this invention, the points 82, FIG. 7, represent a deviation of 9.3 degrees per hour using the compensation of the $5^{th}$ order AGC equation.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims. For example, the described compensation is applicable directly to expanding volumes or volumes where the number of gas molecules is changing as long as the motor force is truly the variable in question. In a tuning fork gyros, the errors appear to be directly related to motor force. Moreover, the AGC signal can be derived from any signal which is proportional to the proof mass drive amplitude; for example, velocity or the integral of position have been used to generate the AGC signal.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A force compensated comb device for microelectromechanical system (MEMS) comprising:
   a MEMS mechanism for providing an output signal representative of a physical quantity;
   a comb drive for actuating said MEMS mechanism;
   a comb drive circuit for providing a drive signal to said comb drive for developing a force applied by said comb drive to said MEMS mechanism to effect a predetermined amplitude of displacement;
   an automatic gain control responsive to a change in said predetermined force to provide a correction signal to said comb drive circuit to maintain said predetermined force; and
   a compensation drive responsive to said correction signal for adjusting the output signal of said MEMS mechanism to compensate for errors in said output signal due to a change in said force.

2. The MEMS system of claim 1 in which said MEMS mechanism is a gyroscope.

3. The MEMS system of claim 1 in which said MEMS mechanism is a tuning fork gyroscope.

4. The MEMS system of claim 1 in which said MEMS mechanism is a temperature sensor.

5. The MEMS system of claim 1 in which said MEMS mechanism is a pressure sensor.

6. The MEMS system of claim 1 in which said compensation device includes microprocessor for executing an nth order constant coefficient equation.

7. The MEMS system of claim 6 in which said microprocessor is programmed to solve the equations wherein a rate output compensated for AGC effects is a function of uncompensated output voltage and an automatic gain control measured voltage.

8. The MEMS system of claim 7 in which said microprocessor is programmed to solve the equations $$\hat{\Omega}_1 = B(V_{AGC}) + S(V_{AGC}) V_g$$

where $\hat{\Omega}_1$ is a rate output compensated for AGC effects, $V_g$ is raw (uncompensated) gyroscope output voltage, and $V_{AGC}$ is an automatic gain control measured voltage;

$$B(V_{AGC}) = B_0 + B_1 V_{AGC} + B_2 V_{AGC}^2 + B_3 V_{AGC}^3 + \ldots$$

where $B(V_{AGC})$ is a modeled bias, a function of the measured AGC voltage; and $$S(V_{AGC}) = S_0 + S_1 V_{AGC} + S_2 V_{AGC}^2 + S_3 V_{AGC}^3 + \ldots$$

where $S(V_{AGC})$ is a modeled scale factor, a function of the measured AGC voltage.

* * * * *